United States Patent
Ferchau et al.

(10) Patent No.: US 7,516,261 B2
(45) Date of Patent: *Apr. 7, 2009

(54) METHOD FOR U3 ADAPTER

(75) Inventors: Joerg Ferchau, Morgan Hill, CA (US); Carlos J. Gonzalez, Los Gatos, CA (US)

(73) Assignee: SanDisk Corporation, Milpitas, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/408,553

(22) Filed: Apr. 21, 2006

(65) Prior Publication Data

US 2008/0005413 A1 Jan. 3, 2008

(51) Int. Cl.
*G06F 13/00* (2006.01)

(52) U.S. Cl. .................. 710/301; 710/300; 710/305; 710/2; 710/36; 711/103

(58) Field of Classification Search ......... 710/300–306, 710/8–10, 36–42, 2, 104; 711/103, 170
See application file for complete search history.

(56) References Cited

U.S. PATENT DOCUMENTS

| | | | |
|---|---|---|---|
| 5,570,315 A | 10/1996 | Tanaka et al. | |
| 5,774,397 A | 6/1998 | Endoh et al. | |
| 5,987,573 A * | 11/1999 | Hiraka | 711/156 |
| 6,046,935 A | 4/2000 | Takeuchi et al. | |
| 6,373,746 B1 | 4/2002 | Takeuchi et al. | |
| 6,456,528 B1 | 9/2002 | Chen | |
| 6,522,580 B2 | 2/2003 | Chen et al. | |
| 6,721,819 B2 | 4/2004 | Estakhri et al. | |
| 6,771,536 B2 | 8/2004 | Li et al. | |
| 6,781,877 B2 | 8/2004 | Cernea et al. | |
| 6,988,174 B1 * | 1/2006 | Yamashita | 711/153 |
| 7,296,098 B2 * | 11/2007 | Shih | 710/13 |
| 2003/0079096 A1 * | 4/2003 | Murakami | 711/156 |
| 2003/0147278 A1 | 8/2003 | Tanaka et al. | |
| 2003/0229736 A1 | 12/2003 | Shih | |
| 2005/0160223 A1 * | 7/2005 | Chen et al. | 711/115 |
| 2006/0294105 A1 * | 12/2006 | Rosenan et al. | 707/9 |
| 2007/0083939 A1 * | 4/2007 | Fruhauf et al. | 726/34 |
| 2007/0112625 A1 * | 5/2007 | Gonzalez et al. | 705/14 |
| 2007/0124536 A1 * | 5/2007 | Carper | 711/115 |
| 2007/0129813 A1 * | 6/2007 | Ferchau | 700/1 |
| 2007/0168564 A1 * | 7/2007 | Conley et al. | 710/1 |
| 2007/0239608 A1 * | 10/2007 | Elbring | 705/51 |
| 2007/0250655 A1 * | 10/2007 | Ferchau et al. | 710/313 |

FOREIGN PATENT DOCUMENTS

WO  WO-03/079183  9/2003

OTHER PUBLICATIONS

HTTP://EN.WIKIPEDIA.ORG/WIKI/U3, pp. 1-6.*
HTTP://WEBOPEDIA.COM/TERM/U/U3_SMART_DRIVE. HTML, p. 1.*

(Continued)

*Primary Examiner*—Christopher B Shin
(74) *Attorney, Agent, or Firm*—Jenkins, Wilson, Taylor & Hunt, P.A.

(57) ABSTRACT

Method for executing an application is provided. The method includes interfacing a U3 adapter with a host system; and interfacing the U3 adapter with a memory device, wherein an application is executed by the U3 adapter and the application uses information stored on the memory device.

10 Claims, 5 Drawing Sheets

OTHER PUBLICATIONS

"U3 Smart Drive Computing Platform", (Jun. 2005).

"U.S. Appl. No. 60/595,357, filed on Jun. 27, 2005".

Mendelson, Edward "The Ultimate USB Key", *PC Magazine* Website; article dated Aug. 15, 2005, accessed on Jan. 28, 2008; URL: http://www.pcmag.com/article2/0%2C2704%2C1849710%2C00.asp.

Spanbauer, Scott "Internet Tips: Internet-on-a-Stick: Mail, Calendar, and Bookmarks", *PC World Magazine* website; article dated Jun. 21, 2005, accessed on Jan. 28, 2008; URL: http://www.pcworld.com/article/id,121210-page,1/article.html.

"U3 Selected to Reveal New Products at Upcoming DEMOfall Conference", U#.com website; pres release dated Aug. 22, 2005, accessed Jan. 8, 2008; URL: http://www.u3.com/news/pr/082205.aspx.

"Office Action from USPTO dated Jan. 31, 2008 for U.S. Appl. No. 11/408,714".

Notice of Allowance and Fee(s) Due for U.S. Appl. No. 11/408,714 (Jun. 27, 2008).

Office Action for U.S. Appl. No. 11/408,714 (Jan. 31, 2008).

"U3 Selected to Reveal New Products at Upcoming DEMOfall Conference," U3 Press Release, http://www.u3.com, p. 1 (Aug. 22, 2005).

Mendelson, "The Ultimate USB Key," Solutions by PC Magazine, http://www.pcmag.com, pp. 1-4 (Aug. 17, 2005).

U.S. Appl. No. 60/595,357 for "Method and System for Enabling Enterprises to Use Detachable Memory Devices that Contain Data and Executable Files in Controlled and Secure Way" (Jun. 27, 2005).

Spanbauer, "Internet Tips: Internet-on-a-Stick: Mail, Calendar, and Bookmarks," PC World, http://www.pcworld.com, pp. 1-3 (Jun. 21, 2005).

"U3: Programme direkt vom USB-Stick starten—Date Storatge Advisors kundigt erste U3-konforme USB-Sticks an", Internet Citation [Online], XP007903199, URL:http://www.golem.de/print.php?a=40511>, (Sep. 19, 2005),the whole document.

International Search Report on corresponding PCT application (PCT/US2007/066703) from International Searching Authority (EPO) dated Nov. 2, 2007.

Written Opinion on corresponding PCT application (PCT/US2007/066703) from International Searching Authority (EPO) dated Nov. 2, 2007.

\* cited by examiner

METHOD FOR U3 ADAPTER

CROSS REFERENCE TO RELATED APPLICATION

This patent application is related to patent application Ser. No. 11/408,714 entitled "U3 ADAPTER" filed on even date herewith, the disclosure of which is incorporated herein by reference in its entirety.

FIELD OF THE INVENTION

The present invention relates to interface devices, and more particularly, to a U3 adapter that interfaces with a host system and a legacy flash device.

BACKGROUND

The U3 standard is being developed that will allow users to launch applications from portable/removable USB (universal serial bus) flash memory systems. Smart U3 drives are being developed for this purpose. The U3 specification is available at the website located at U3.com and is incorporated herein by reference in its entirety.

Flash memory systems are typically provided as a memory card or flash drive that is coupled to a variety of host systems, for example, a digital camera, laptop/notebook computers, desktop computers, cell phones and other devices. Although U3 enabled drives are being developed, there are millions of flash memory systems that are currently being used by users and these systems are not U3 enabled. Such flash memory systems are referred to herein as legacy flash memory systems (or "legacy devices"). It is noteworthy that the term legacy devices, as used herein, are intended to include other storage devices (for example, hard disks).

Legacy devices that are based on the CF (compact flash standard, incorporated herein by reference in its entirety), SD(Secure Digital Standard, incorporated herein by reference in its entirety), MS-Pro (Memory Stick Pro Standard, incorporated herein by reference in its entirety), or other standards, cannot easily be integrated with the U3 specification without using special drivers in the Windows® operating system environment. One reason for that is, Windows® operating systems treat USB devices/drives differently than devices based on the CF, SD, MS-Pro or other similar standards.

Therefore, there is a need for a method and system that will allow users of legacy devices to use data stored on legacy systems while taking advantage of the U3 applications.

SUMMARY OF THE INVENTION

In one aspect of the present invention, a method for executing an application is provided. The method includes interfacing a U3 adapter with a host system; and interfacing the U3 adapter with a memory device, wherein an application is executed by the U3 adapter and the application uses information stored on the memory device.

This brief summary has been provided so that the nature of the invention may be understood quickly. A more complete understanding of the invention can be obtained by reference to the following detailed description of the preferred embodiments thereof, in connection with the attached drawings.

BRIEF DESCRIPTION OF THE DRAWINGS

The foregoing features and other features of the present invention will now be described with reference to the drawings of a preferred embodiment. In the drawings, the same components have the same reference numerals. The illustrated embodiment is intended to illustrate, but not to limit the invention. The drawings include the following Figures.

DETAILED DESCRIPTION OF THE PREFERRED EMBODIMENTS

To facilitate an understanding of the preferred embodiment, the general architecture of the overall system and a host system/non-volatile memory storage device will first be described. The specific architecture and operation of the preferred embodiment will then be described with reference to the general architecture.

Overall System

Figure 1A:
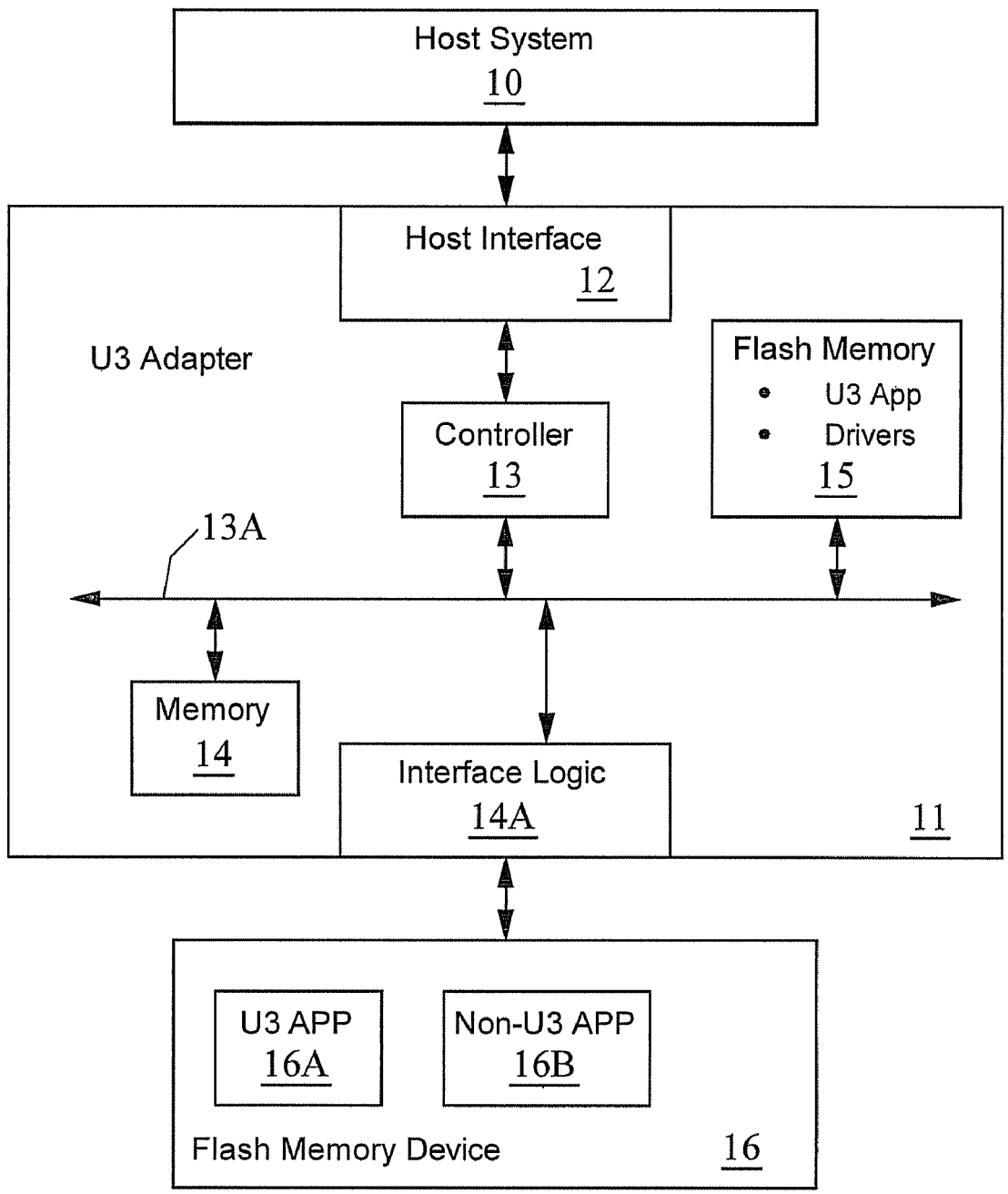
FIG. 1A shows a block diagram of an overall system using a U3 Adapter, according to one aspect of the present invention.

FIG. 1A shows a top-level block diagram a system using a U3 Adapter (may also be referred to as "Adapter") 11, according to one aspect of the present invention. Adapter 11 interfaces with a host system 10 via host interface 12. In one aspect, Adapter 11 operates as a USB slave. Hence, a host system that can operate as a USB host can interface with Adapter 11. It is noteworthy that the adaptive aspects of the present invention are not limited to any particular type of standard/non-standard interface.

Adapter 11 includes a controller 13 that has access to flash memory cells 15 and other components through an internal bus 13A. Flash memory cells 15 can store U3 applications and device drivers to support and interface with legacy storage devices. Controller 13 also has random access memory (and/or read only memory) 14 from where software code (firmware) for operating Adapter 11 may be executed. Controller 13 can also execute U3 applications from memory 14.

Adapter 11 interfaces with a legacy flash device 16 (may also be referred to as "flash memory device" or "legacy storage device" or "legacy device") via interface logic 14A. Legacy storage device 16 can store Non-U3 applications/data 16B and U3 applications 16A. Adapter 11 can execute a U3 application (16A) stored in legacy device 16 and/or use data stored in legacy device memory cells (107/108, FIG. 1B).

Figure 1B:
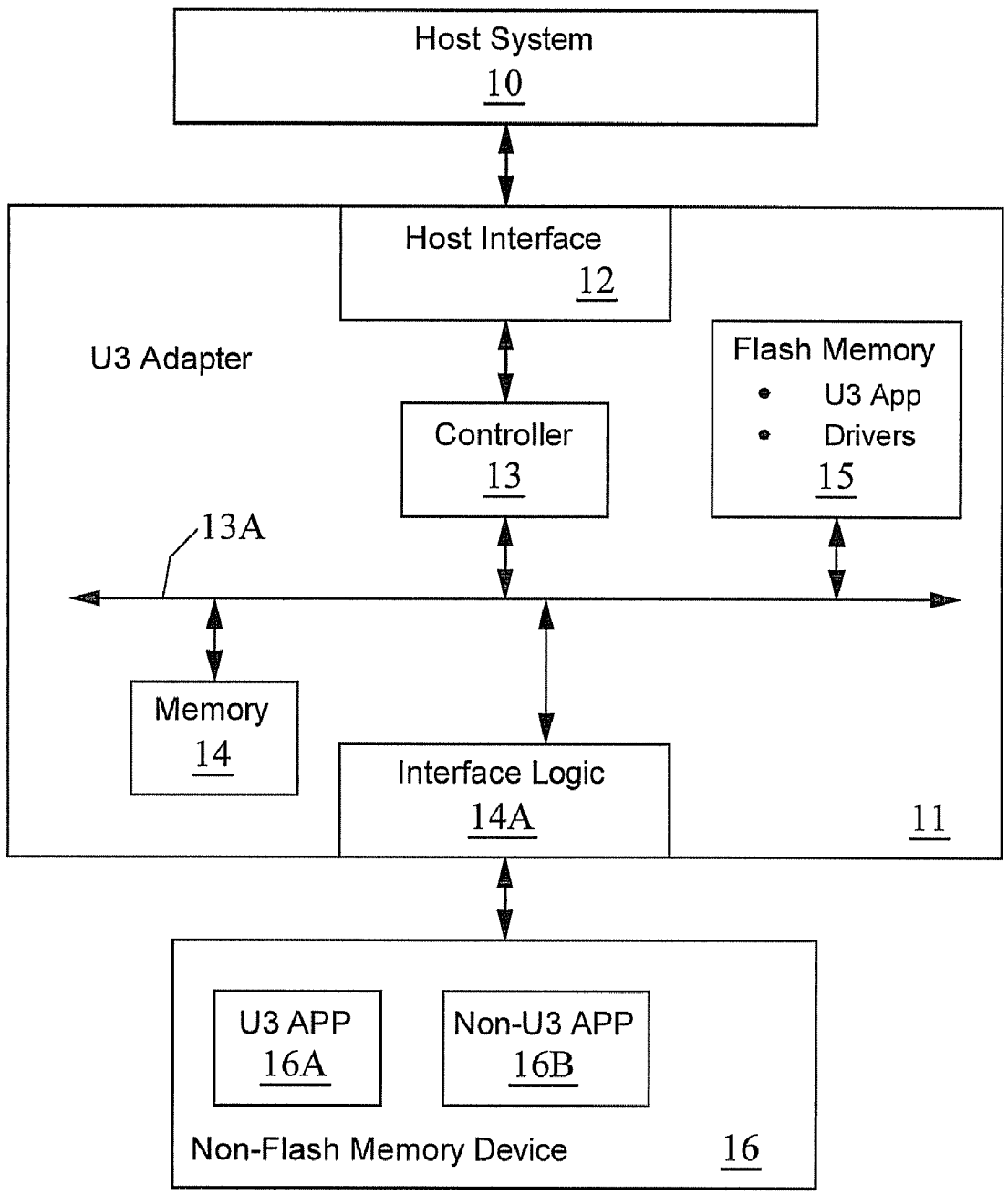
FIG. 1B shows a block diagram of an over-all system architecture using a U3 adapter and a non-flash device, according to another aspect of the present invention.

It is noteworthy that although the example shown in FIG. 1A is based on a flash memory device, the adaptive aspects of the present invention are not limited to a flash memory device. For example, interface logic 14A can interface with a hard disk or any other type of memory device. For example, as illustrated in FIG. 1B, legacy device 16 is a non-flash memory device with which interface logic 14A can interface.

Figure 1C:
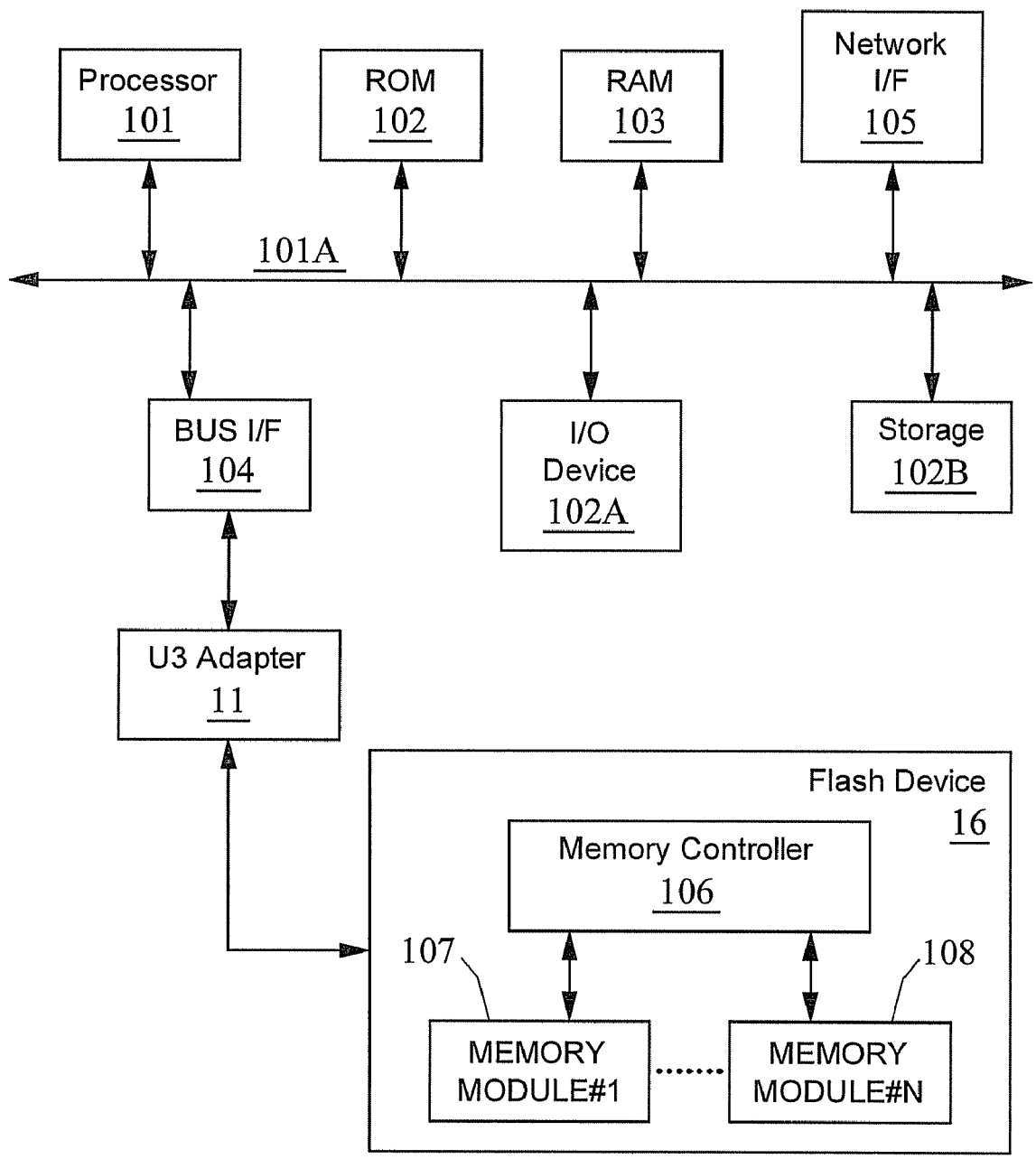
FIG. 1C shows a block diagram of the internal architecture of a host system that is used with a U3 Adapter, according to one aspect of the present invention.

Host System/Flash Memory FIG. 1C shows a block diagram of host system 10. Host system 10 includes a central processing unit ("CPU") (or microprocessor) 101 connected to a system bus 101A. Random access main memory ("RAM") 103 is coupled to system bus 101A and provides CPU 101 with access to memory storage. When executing program instructions, CPU 101 stores those process steps in RAM 103 and executes the stored process steps out of RAM 103.

Host system 10 connects to a computer network (not shown) via network interface 105. Host system 10 typically uses a modem, an integrated services digital network (ISDN) connection, or the like to connect with the network. The network connection allows host system 10 to download data files or any other type of information.

Read only memory ("ROM") 102 is provided to store invariant instruction sequences such as start-up instruction sequences or basic Input/output operating system (BIOS) sequences.

Input/Output ("I/O") devices, for example, a keyboard, a pointing device ("mouse"), a monitor, a modem and the like are also provided (not shown) and are coupled via I/O devices interface 102A. It is noteworthy that I/O device interface 102A can have more than one interface to couple the different types of I/O devices.

Host system 10 may also include a computer-readable memory medium such as a hard disk 102B for storing readable data. Besides other programs, disk 102B can store application programs including web browsers by which host system 10 connects to the Internet.

It is noteworthy that the host system 10 configuration and system architecture can vary and the present invention is not limited to any particular type of configuration/architecture. For example, host system 10 may be a kiosk type terminal that can connect to the Internet and does not have significant computing capabilities. In another case, host system 10 may be a desktop/notebook computer or any other types of computing system.

Host system 10 interfaces with U3 adapter 11 via a bus interface module 104. In one aspect, bus interface module 104 supports a USB device and U3 adapter 11 interfaces with the host system as a USB device.

Flash memory device 16 is coupled to adapter 11 and includes a memory controller module 106 (may also be referred to as "memory controller" or "controller module") and solid-state memory modules 107-108 (shown as Memory Module #1 and Memory Module #N).

There are currently many different flash memory cards/devices that are commercially available, examples being the CompactFlash (CF), the MultiMediaCard (MMC), Secure Digital (SD), miniSD, Memory Stick, SmartMedia and TransFlash cards. Although each of these cards has a unique mechanical and/or electrical interface according to its standardized specifications, the flash memory included in each is very similar. These cards are all available from SanDisk Corporation, assignee of the present application.

SanDisk also provides a line of flash drives under its Cruzer trademark, which are hand held memory systems in small packages that have a Universal Serial Bus (USB) plug for connecting with a host by plugging into the host's USB receptacle. Each of these memory cards and flash drives includes controllers that interface with the host and control operation of the flash memory within them.

Host systems (for example, host system 10) that use such memory cards and flash drives are many and varied. They include personal computers (PCs), laptop and other portable computers, cellular telephones, personal digital assistants (PDAs), digital still cameras, digital movie cameras and portable audio players. The host typically includes a built-in receptacle for one or more types of memory cards or flash drives but some require adapters into which a memory card is plugged.

A NAND architecture of the memory cell arrays 107-108 is currently preferred, although other architectures, such as NOR, can also be used instead. Examples of NAND flash memories and their operation as part of a memory system may be had by reference to U.S. Pat. Nos. 5,570,315, 5,774,397, 6,046,935, 6,373,746, 6,456,528, 6,522,580, 6,771,536 and 6,781,877 and United States patent application publication no. 2003/0147278.

Figure 1D:
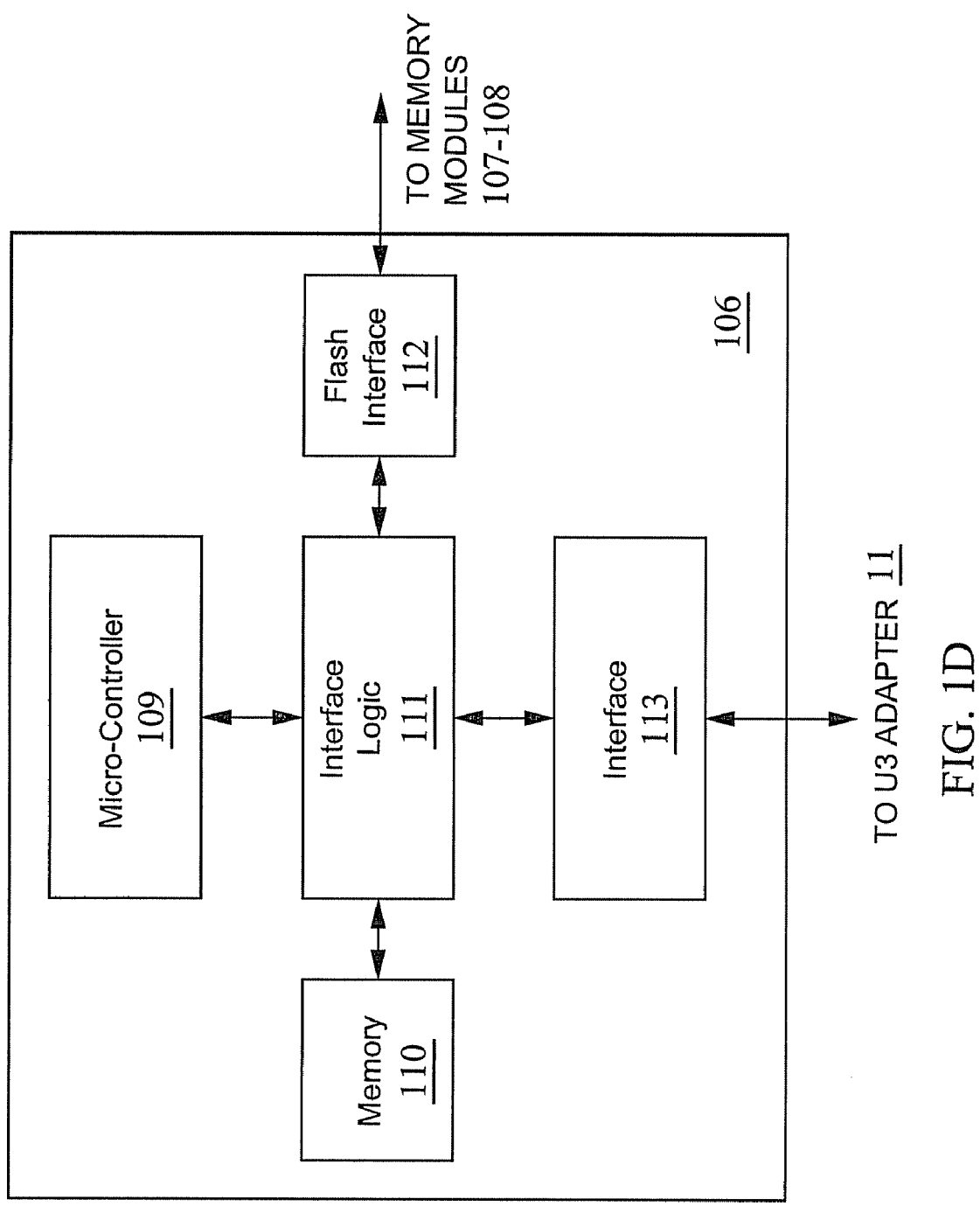
FIG. 1D shows a block diagram of a memory controller for a flash memory device, used according to one aspect of the present invention.

FIG. 1D shows a block diagram of the internal architecture of controller module 106. Controller module 106 includes a microcontroller 109 that interfaces with various other components via interface logic 111. Memory 110 stores firmware and software instructions that are used by microcontroller 109 to control the operation of flash device 50. Memory 110 may be volatile re-programmable random access memory ("RAM"), a non-volatile memory that is not re-programmable ("ROM"), a one-time programmable memory or a re-programmable flash electrically-erasable and programmable read-only memory ("EEPROM").

Interface 113 interfaces with U3 Adapter 11. This allows Adapter 11 to access data that is stored in memory cells 107/108. Controller module 106 includes a flash interface 112 that interfaces with memory modules 107-108.

Figure 2:
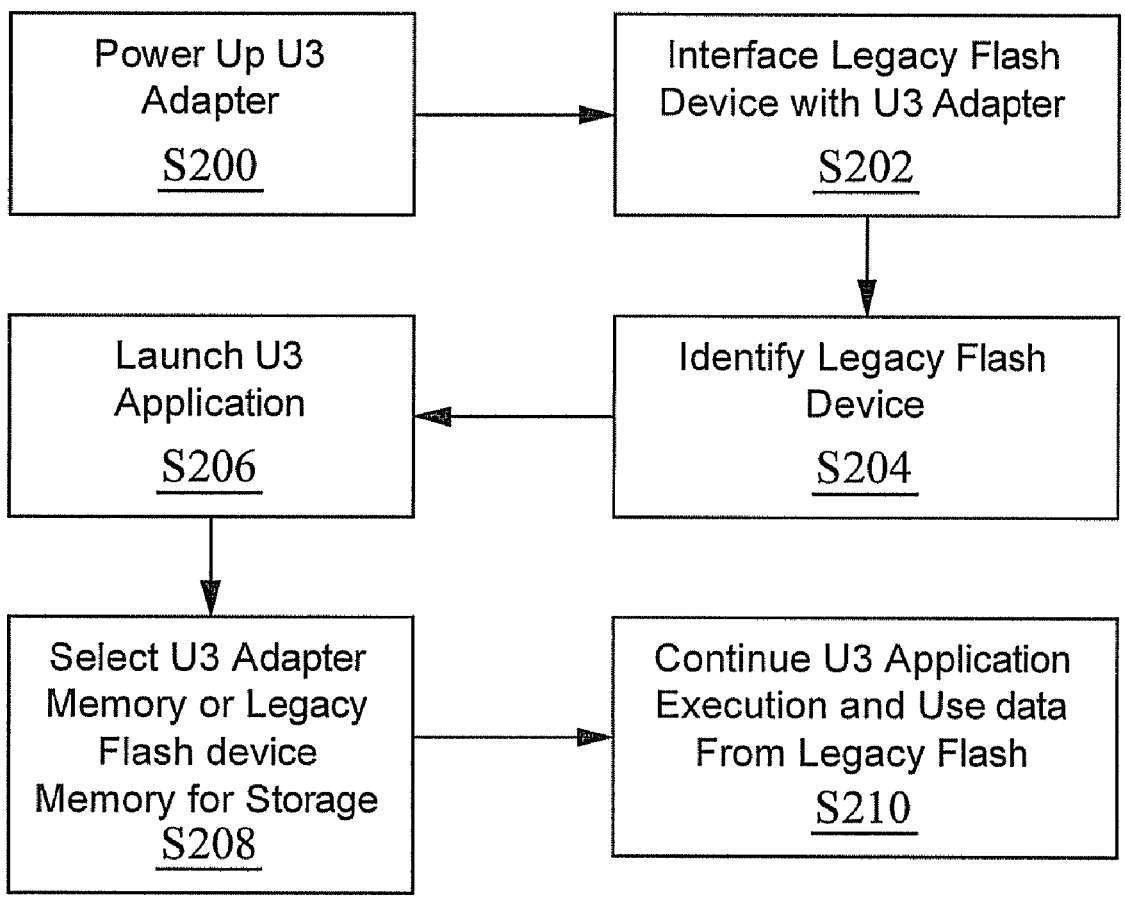
FIG. 2 shows a process flow diagram for using a U3 Adapter, according to one aspect of the present invention.

Process Flow: FIG. 2 shows a top-level process flow diagram for using Adapter 11, according to one aspect of the present invention. Turning in detail to FIG. 2, in step S200, Adapter 11 is powered on and connected to host system 10. In one aspect of the present invention, Adapter 11 may be powered by host system 10 or is self-powered. Host system 10 recognizes Adapter 11 as a USB device.

In step S202, legacy device 16 interfaces with Adapter 11. Adapter 11 has the appropriate connecter/receptacle to receive legacy device 16.

When legacy flash device 16 is inserted (or interfaces) in Adapter 11, in step S204, the legacy device is identified by Adapter 11. This ensures that Adapter 11 can support the type of legacy device 16.

In step S206, a U3 application is launched. Adapter 11 can launch the application by copying the U3 application from legacy device 16 or from Adapter flash memory 15.

In step S208, the user selects either Adapter flash memory 15 or legacy device memory 107/108 for storing any information. In step S210, U3 application is executed by Adapter 11. Data stored on legacy device 16 can be accessed and used by the U3 application.

While the present invention is described above with respect to what is currently considered its preferred embodiments, it is to be understood that the invention is not limited to that described above. To the contrary, the invention is intended to cover various modifications and equivalent arrangements within the spirit and scope of the appended claims.

What is claimed is:

1. A method for executing an application, comprising:
    interfacing an adapter for allowing launching of applications from portable storage devices with a host system; and
    interfacing the adapter with a portable memory device that stores an application, wherein, when the memory device is coupled to the adapter and the adapter is coupled to the host system, the application is executed by the adapter and the application uses information stored on the memory device.

2. The method of claim 1, wherein the application can store information on the memory device or in flash memory cells of the adapter.

3. A method for executing an application, comprising:
interfacing an adapter for allowing launching of applications from portable storage devices with a host system; and
interfacing the adapter with a memory device, wherein an application is executed by the adapter and the application uses data stored in the portable memory device, and wherein a user selects flash memory of the adapter or the memory device to store data.

4. The method of claim 1, wherein the adapter operates as a USB device.

5. The method of claim 1, wherein the adapter copies an application stored on the memory device to a memory of the adapter and executes the application.

6. The method of claim 1, wherein the adapter copies an application stored in flash memory cells of the adapter to a memory of the adapter and executes the application.

7. The method of claim 1, wherein a controller executes the application.

8. The method of claim 1, wherein the memory device is a flash memory device.

9. The method of claim 1, wherein the memory device is a non-flash memory device.

10. The method of claim 1, wherein the memory device comprises a legacy memory device.

* * * * *